(12) United States Patent
Kawano et al.

(10) Patent No.: US 11,165,603 B2
(45) Date of Patent: Nov. 2, 2021

(54) COMMUNICATION SYSTEM AND COMMUNICATION METHOD USING VIRTUAL CUSTOMER PREMISE EQUIPMENT

(71) Applicant: Nippon Telegraph and Telephone Corporation, Tokyo (JP)

(72) Inventors: Shinya Kawano, Tokyo (JP); Katsuma Miyamoto, Tokyo (JP); Akihiro Kimura, Tokyo (JP); Akihiro Okada, Tokyo (JP); Hiroaki Sato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/045,805

(22) PCT Filed: Apr. 9, 2019

(86) PCT No.: PCT/JP2019/015467
§ 371 (c)(1),
(2) Date: Oct. 7, 2020

(87) PCT Pub. No.: WO2019/198712
PCT Pub. Date: Oct. 17, 2019

(65) Prior Publication Data
US 2021/0067371 A1    Mar. 4, 2021

(30) Foreign Application Priority Data
Apr. 10, 2018 (JP) .............................. JP2018-075460

(51) Int. Cl.
*H04L 12/46* (2006.01)
*H04W 12/06* (2021.01)
(Continued)

(52) U.S. Cl.
CPC ...... *H04L 12/4633* (2013.01); *H04L 61/2592* (2013.01); *H04L 63/0876* (2013.01); *H04W 12/06* (2013.01); *H04W 60/00* (2013.01)

(58) Field of Classification Search
CPC ...... H04W 12/00–80; H04W 60/00–06; H04L 12/2865–2898; H04L 12/4633; H04L 63/08–0892; H04L 63/0272
See application file for complete search history.

(56) References Cited

U.S. PATENT DOCUMENTS 6,118,768 A * 9/2000 Bhatia ................. H04L 12/2856
370/254
6,189,102 B1 * 2/2001 Beser .................. H04L 61/2015
709/201
(Continued)

FOREIGN PATENT DOCUMENTS

JP      2016057672 A  *  4/2016
JP      2017-34506       2/2017
WO   WO-2016132262 A1 *  8/2016  ............. H04L 45/74

OTHER PUBLICATIONS

Pastor, Antonio, and Jesús Folgueira. "Practical experience in NFV security field: Virtual home gateway." Guide to Security in SDN and NFV. Springer, Cham, 2017. 127-148. (Year: 2017).*
(Continued)

*Primary Examiner* — David R Lazaro
*Assistant Examiner* — Julian Chang
(74) *Attorney, Agent, or Firm* — Fish & Richardson P.C.

(57) ABSTRACT

In a communication system including a first virtual CPE to which a terminal belongs, a second virtual CPE, and an authentication server, when the terminal connects to the second virtual CPE, the second virtual CPE confirms whether terminal information of the terminal is registered in the authentication server, and when the terminal information is registered in the authentication server, the authentication
(Continued)

server notifies the second virtual CPE of an address of the first virtual CPE, and the second virtual CPE performs a tunnel connection to the first virtual CPE.

8 Claims, 12 Drawing Sheets

(51) Int. Cl.
    *H04W 60/00*     (2009.01)
    *H04L 29/12*     (2006.01)
    *H04L 29/06*     (2006.01)

(56) References Cited

U.S. PATENT DOCUMENTS

| | | | | |
|---|---|---|---|---|
| 6,351,773 | B1* | 2/2002 | Fijolek | H04L 61/2015 709/222 |
| 6,577,642 | B1* | 6/2003 | Fijolek | H04L 12/2801 370/465 |
| 6,611,868 | B1* | 8/2003 | Arutyunov | H04L 12/2856 709/227 |
| 6,717,944 | B1* | 4/2004 | Bryden | H04L 12/4633 370/392 |
| 9,288,645 | B1* | 3/2016 | Chen | H04L 65/1006 |
| 9,374,267 | B2* | 6/2016 | Poirier | H04L 63/0892 |
| 2002/0086705 | A1* | 7/2002 | Yokoyama | H04L 12/4645 455/560 |
| 2002/0101857 | A1* | 8/2002 | Heller | H04L 69/16 370/352 |
| 2004/0081109 | A1* | 4/2004 | Oishi | H04L 63/0884 370/310 |
| 2007/0011301 | A1* | 1/2007 | Ong | H04L 61/2015 709/224 |
| 2007/0011735 | A1* | 1/2007 | Weber | H04N 7/17309 726/14 |
| 2007/0022469 | A1* | 1/2007 | Cooper | H04K 1/00 726/3 |
| 2007/0058621 | A1* | 3/2007 | Okmianski | H04L 61/1535 370/389 |
| 2007/0140195 | A1* | 6/2007 | Kaftan | H04L 29/12839 370/338 |
| 2008/0148310 | A1* | 6/2008 | Strickland | G06F 16/9535 725/30 |
| 2008/0298799 | A1* | 12/2008 | Takihiro | H04L 12/2861 398/2 |
| 2009/0047945 | A1* | 2/2009 | Zhang | H04W 84/045 455/424 |
| 2009/0150955 | A1* | 6/2009 | Choi | H04L 61/103 725/111 |
| 2009/0296567 | A1* | 12/2009 | Yasrebi | H04L 41/0813 370/221 |
| 2010/0167732 | A1* | 7/2010 | Vakil | H04W 60/00 455/435.1 |
| 2011/0058657 | A1* | 3/2011 | Alegret | H04N 7/17318 379/32.04 |
| 2011/0161510 | A1* | 6/2011 | Arnold | H04L 12/2801 709/229 |
| 2012/0173689 | A1* | 7/2012 | Yang | G06F 16/214 709/223 |
| 2012/0297087 | A1* | 11/2012 | Humble | H04L 61/2589 709/238 |
| 2015/0006737 | A1* | 1/2015 | Chen | H04L 12/4633 709/226 |
| 2016/0241515 | A1* | 8/2016 | Pai | H04W 48/08 |
| 2016/0285703 | A1* | 9/2016 | Joe | H04L 41/5051 |
| 2016/0286417 | A1* | 9/2016 | Joe | H04L 41/0886 |
| 2017/0085529 | A1* | 3/2017 | Finkelstein | H04L 63/162 |
| 2017/0192806 | A1* | 7/2017 | Koat | H04L 12/66 |
| 2017/0272274 | A1* | 9/2017 | Onno | H04L 45/02 |
| 2017/0289291 | A1* | 10/2017 | S | H04L 12/4633 |
| 2017/0310559 | A1* | 10/2017 | Jain | H04L 41/082 |
| 2018/0026794 | A1* | 1/2018 | Nakano | H04L 63/10 713/176 |
| 2018/0034801 | A1* | 2/2018 | Nakano | H04L 9/321 |
| 2018/0048716 | A1* | 2/2018 | Madhayyan | H04L 61/2015 |
| 2018/0167321 | A1* | 6/2018 | Foxworthy | H04L 61/1511 |
| 2018/0288614 | A1* | 10/2018 | Zaks | H04L 63/06 |
| 2018/0343146 | A1* | 11/2018 | Dunbar | H04L 45/42 |
| 2019/0141572 | A1* | 5/2019 | Zaks | H04L 9/3242 |
| 2019/0223017 | A1* | 7/2019 | Lai | H04W 60/00 |
| 2019/0245717 | A1* | 8/2019 | Kim | H04L 67/10 |
| 2020/0304458 | A1* | 9/2020 | Fujii | H04L 61/2517 |
| 2021/0092067 | A1* | 3/2021 | Monma | H04L 41/5067 |
| 2021/0105227 | A1* | 4/2021 | Kawano | H04L 12/2803 |
| 2021/0168582 | A1* | 6/2021 | Ceccarelli | H04W 40/34 |

OTHER PUBLICATIONS

Wang, Cong, Maode Ma, and Zenghua Zhao. "An enhanced authentication protocol for WRANs in TV white space." Security and Communication Networks 8.13 (2015): 2267-2278. (Year: 2015).*

C. Wang, M. Ma and L. Zhang, "An Efficient EAP-Based Pre-Authentication for Inter-WRAN Handover in TV White Space," in IEEE Access, vol. 5, pp. 9785-9796, 2017, doi: 10.1109/ACCESS.2017.2706738. (Year: 2017).*

Jpn.nec.com, [online], "Virtualized Customer Premises Equipment vCPE," 2018, retrieved on Feb. 27, 2018, retrieved from URL<http://jpn.nec.com/tcs/vcpe/index.html>, 7 pages (with English Translation).

Juniper.net, [online], "Enterprise Managed Services Offerings—Controlling End Users with Virtual CPE," 2018, retrieved on Feb. 27, 2018, retrieved from URL<https://www.juniper.net/jp/jp/solutions/nfv/vcpe/>, 7 pages (with English Translation).

* cited by examiner

Fig. 4A TERMINAL INFORMATION TABLE

| TERMINAL MAC ADDRESS | ACCOMMODATION vCPE |
|---|---|
| MAC addr 1 | IP addr 1 |
| MAC addr 2 | IP addr 1 |
| MAC addr 3 | IP addr 2 |
| ⋮ | ⋮ |

Fig. 4B COOPERATIVE PERFORMANCE PRESENCE/ABSENCE TABLE

| vCPE IP ADDRESS | PRESENCE OR ABSENCE OF OUTSIDE HOME CONNECTION | OTHER vCPE CONNECTION PERMISSION |
|---|---|---|
| IP addr 1 | YES (1) | NOT PERMITTED (0) |
| IP addr 2 | NO (0) | NOT PERMITTED (0) |
| IP addr 3 | YES (1) | PERMITTED (1) |
| ⋮ | ⋮ | ⋮ |

Fig. 6A MAC TABLE

| TERMINAL MAC ADDRESS | TIMER | PRESENCE OR ABSENCE OF OUTSIDE-HOME CONNECTION |
|---|---|---|
| MAC addr 1 | 0 | YES (1) |
| MAC addr 2 | timer 1 | NO (0) |
| MAC addr 3 | 0 | YES (1) |
| ⋮ | ⋮ | ⋮ |

Fig. 6B NAT TABLE

| TERMINAL IP ADDRESS | CONVERSION IP ADDRESS |
|---|---|
| IP addr 1 | IP addr 1′ |
| IP addr 2 | IP addr 2′ |
| IP addr 3 | IP addr 3′ |
| ⋮ | ⋮ |

COMMUNICATION SYSTEM AND COMMUNICATION METHOD USING VIRTUAL CUSTOMER PREMISE EQUIPMENT

CROSS-REFERENCE TO RELATED APPLICATIONS

This application is a National Stage application under 35 U.S.C. § 371 of International Application No. PCT/JP2019/015467, having an International Filing Date of Apr. 9, 2019, which claims priority to Japanese Application Serial No. 2018-075460, filed on Apr. 10, 2018. The disclosure of the prior application is considered part of the disclosure of this application, and is incorporated in its entirety into this application.

TECHNICAL FIELD

The present invention relates to a technology for a terminal to connect to the Internet or the like using a virtual CPE.

BACKGROUND ART

In order for a terminal in a home to make an Internet connection, it is common for the terminal to connect to a network line of a communication service provider and then connect to the Internet. A more flexible connection service is required for the connection to the line of the communication service provider.

A virtual Customer Premise Equipment (vCPE) technology for deploying some functions such as a Home Gate Way (HGW) on a network has been proposed and put to practical use in order to provide service of a communication service provider (for example, NPLs 1 and 2) flexibly and in a timely manner.

Normally, when a terminal of a subscriber connects to a network line of a communication service provider, line authentication of the communication service provider is performed, and a connection is made when the authentication is successful. In the line authentication, a service condition for each subscriber is confirmed, and the service condition is applied.

CITATION LIST

Non Patent Literature

NPL 1: NEC, vCPE virtualized Customer Premise Equipment, Internet, URL<http://jpn.nec.com/tcs/vcpe/index.html>

NPL 2: JUNIPER, Virtualized CPE-Juniper Networks, Internet, URL <https://www.juniper.net/jp/jp/solutions/nfv/vcpe/>

SUMMARY OF THE INVENTION

Technical Problem

Because a scheme using the virtual CPE described above is a scheme for providing a connection service to a terminal connected to a CPE in a home, a complex VPN setting or the like is required for use of services associated with a line of a subscriber outside the home.

Further, because it is necessary to access an in-home VPN server over the Internet when VPN is used, this is disadvantageous in terms of communication quality as compared with a case of access via only communication inside a communication service provider network.

The present invention has been made in view of the foregoing point, and an object of the present invention is to provide a technology for enabling a terminal of a subscriber to perform a network connection outside a home similar to inside a home without a complex setting such as a VPN setting.

Means for Solving the Problem

According to a disclosed technology, there is provided a communication system including a first virtual CPE to which a terminal belongs, a second virtual CPE, and an authentication server, wherein, when the terminal connects to the second virtual CPE, the second virtual CPE confirms whether terminal information of the terminal is registered in the authentication server, and when the terminal information is registered in the authentication server, the authentication server notifies the second virtual CPE of an address of the first virtual CPE, and the second virtual CPE performs a tunnel connection to the first virtual CPE.

Effects of the Invention

According to the disclosed technology, a technology for enabling a terminal of a subscriber to perform a network connection outside a home similar to inside a home without a complex setting such as a VPN setting is provided.

BRIEF DESCRIPTION OF DRAWINGS

FIGS. 4A and 4B are diagrams illustrating an example of a table stored in an authentication server.

FIGS. 6A and 6B are diagrams illustrating an example of a set of tables in the vCPE.

DESCRIPTION OF EMBODIMENTS

Hereinafter, an embodiment of the present invention (the present embodiment) will be described with reference to drawings. Hereinafter, a vCPE cooperation scheme for enabling a subscriber to use the same services as inside the home even outside the home without a complex setting by a vCPE outside of the home connecting to a vCPE in the home and performing transfer based on a NAT function of the vCPE will be described. The embodiment to be described below is merely an example, and embodiments in which the present invention is applied are not limited to the following embodiment.

Overview of Embodiment

Figure 1:
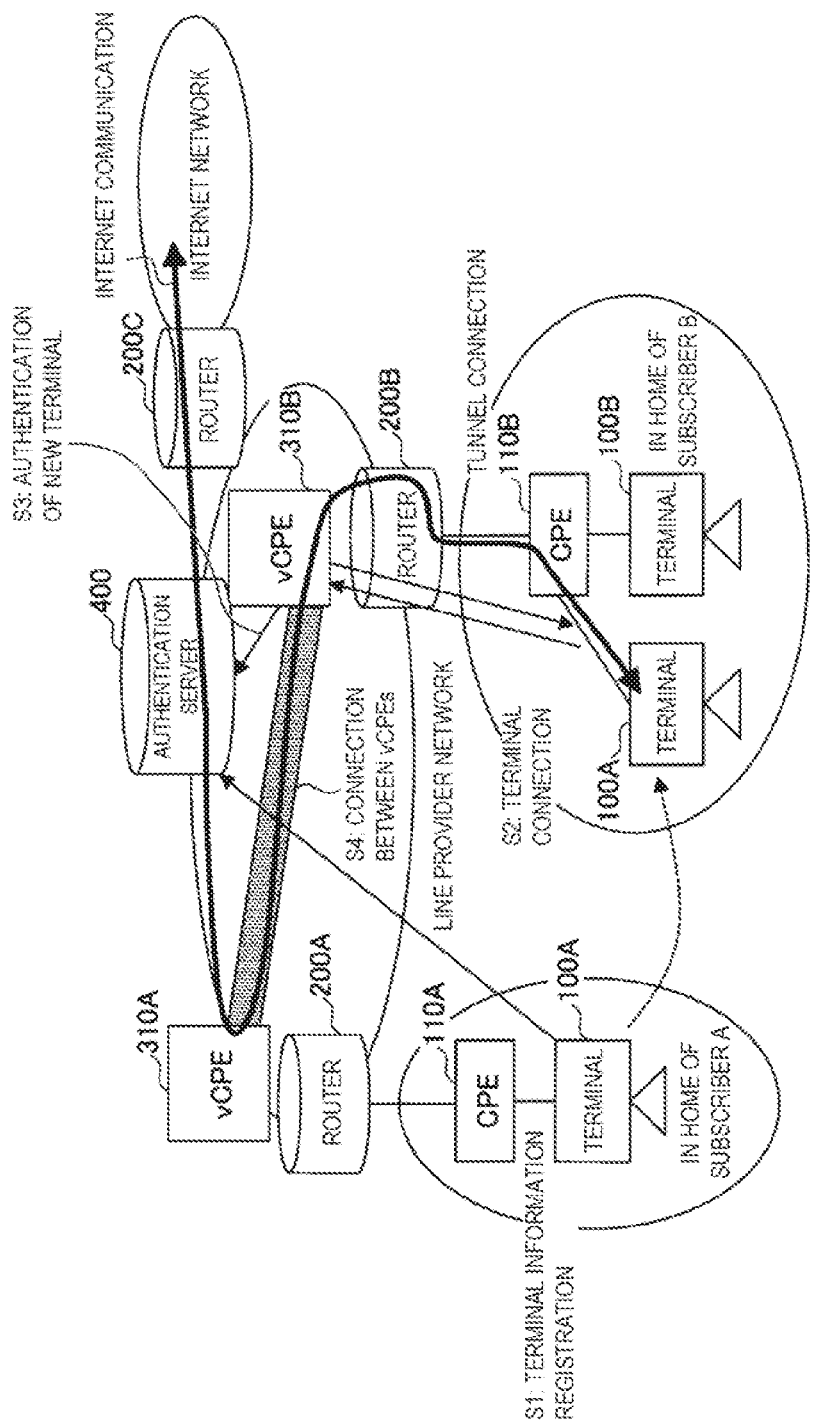
FIG. 1 is a diagram illustrating an overview of an embodiment of the present invention.

An overview of an embodiment will be described with reference to FIG. 1. In the embodiment, an authentication server 400 is disposed in a line provider network (which may be referred to as a communication service provider network), as illustrated in FIG. 1. The authentication server 400 includes a set of terminal information (for example, a MAC address) of a terminal of a subscriber and information (for example, an IP address) of a vCPE to which the terminal of the subscriber belongs. In S, terminal information of a terminal 100A of subscriber A is registered in the authentication server 400, as illustrated in FIG. 1.

In S2, the terminal 100A of subscriber A connects to the network outside the home (in the home of subscriber B in the example of FIG. 1). In this case, the connection destination vCPE 310B performs query of the authentication server 400 on the basis of terminal information of the terminal 100A (S3), and when the information is registered, the vCPE 310B is connected to the vCPE 310A to which the terminal 100A of subscriber A belongs (S4). The terminal 100A outside the home performs, for example, Internet communication via the vCPE 310A. Hereinafter, a configuration and operation of the system according to the embodiment will be described in greater detail.

System Configuration

Figure 2:
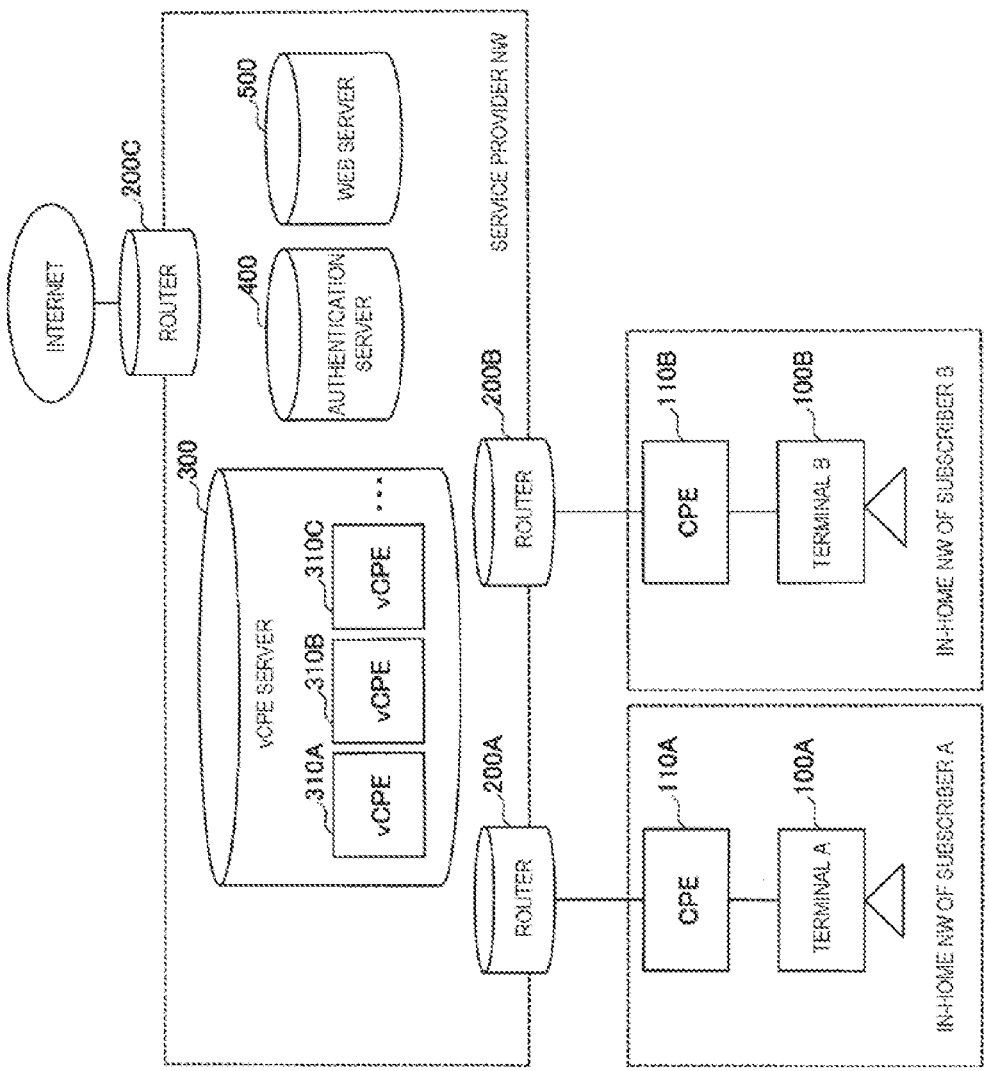
FIG. 2 is an overall configuration diagram of a system according to the embodiment of the present invention.

FIG. 2 illustrates an example of a configuration of a communication system according to the embodiment. In FIG. 2, as an example, an in-home NW of subscriber A and an in-home NW of subscriber B are shown as in-home NWs. The in-home NW of subscriber A includes a terminal 100A and a CPE 110A, and the in-home NW of subscriber B includes a terminal 100B and a CPE 110B. The in-home NW of subscriber A and the in-home NW of subscriber B are connected to a service provider NW by respective routers 200A and 200B.

The service provider NW includes a vCPE server 300, an authentication server 400, and a web server 500. Further, the service provider NW is connected to the Internet by a router 200C. The web server 500 is used only when there is a setting performed by a subscriber.

In the vCPE server 300, a plurality of vCPEs are operating. A vCPE 310A, a vCPE 310B, and a vCPE 310C are illustrated in FIG. 1 as examples. Hereinafter, the vCPE 310A, the vCPE 310B, and the vCPE 310C are described as a "vCPE 310" when collectively referred to. Further, the CPE 110A and the CPE 110B are described as a "CPE 110" when collectively referred to. The terminal 100A and the terminal 100B are described as a "terminal 100" when collectively referred to.

The vCPE 310 in the embodiment includes functions such as distribution of an address at the time of terminal connection and termination of a tunnel from the CPE 110. Further, the CPE 110 includes, for example, a tunnel connection function to the vCPE 310.

Figure 3:
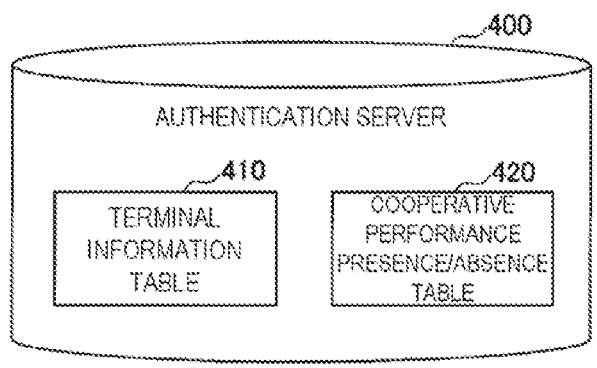
FIG. 3 is a configuration diagram of an authentication server.

As illustrated in FIG. 3, the authentication server 400 holds a terminal information table 410 and a cooperative performance presence/absence table 420. The cooperative performance presence/absence table 420 is included only when a subscriber sets presence/absence of a home connection from outside the home or another vCPE connection from the home.

As illustrated in FIG. 4A, the terminal information table 410 stores a set of a terminal MAC address and an IP address of a vCPE accommodating a terminal having the terminal MAC address.

As illustrated in FIG. 4B, the cooperative performance presence/absence table stores an IP address of the vCPE, the presence/absence of an outside-home connection using a terminal accommodated in the vCPE, and information on whether connection to the vCPE from another vCPE is approved.

Figure 5:
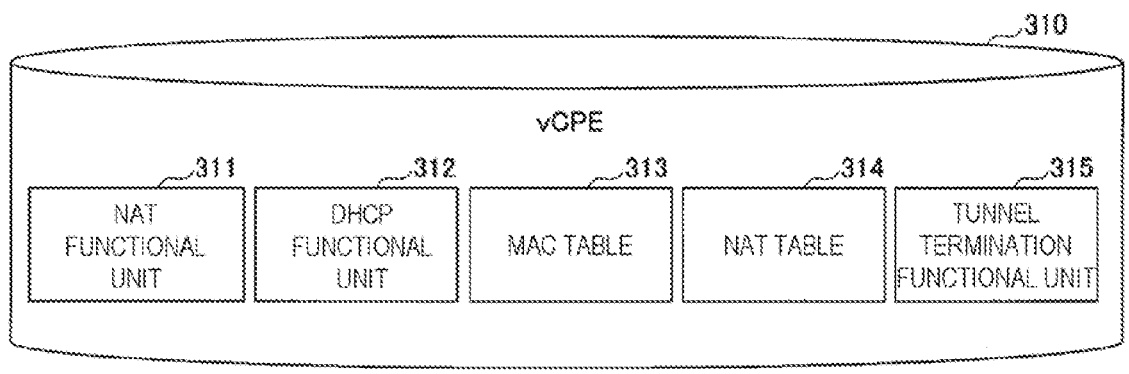
FIG. 5 is a configuration diagram of a vCPE.

As illustrated in FIG. 5, the vCPE 310 includes an NAT functional unit 311 that executes NAT processing, a DHCP functional unit 312 that performs IP address allocation, a MAC table 313, an NAT table 314, and a tunnel termination functional unit 315 that performs tunnel termination.

As illustrated in FIG. 6A, the MAC table 313 includes a timer value and outside-home connection presence/absence information for each terminal (each MAC address of the terminal) together with the MAC address of the terminal. The MAC table 313 that does not include the timer information or the outside-home connection presence/absence information may be used as a configuration of a basic pattern.

It is possible to set the presence/absence of outside-home movement for each terminal and automatically update the terminal information in the MAC table 313 by adding the timer information and the outside-home connection presence/absence information to the MAC table 313. Specific description is as follows.

First, the presence/absence information of the outside-home connection and the timer information are added to the MAC table 313 of the vCPE 310. For a terminal with the outside-home connection, terminal information and outside-home connection information are transmitted using the SOAP API or the like via the web server from the terminal such that the outside-home connection information of the terminal is updated to presence (1). When the outside-home connection is present (1), automatic deletion of entries through timer management is not performed.

For a terminal with no outside-home connection, the outside-home connection is updated to absence (0), and an entry of a terminal not used for a certain period of time is automatically deleted through timer management. For example, in an example of entries in a second line in FIG. 6A, the vCPE 310 deletes a relevant entry when the vCPE 310 detects that there is no communication of the terminal for a time of timer1.

As illustrated in FIG. 6B, the NAT table 314 holds a terminal IP address and a transformed IP address in association with each other.

Example of Hardware Configuration

Each of the devices (each of the authentication server 400, the vCPE server 300, and the web server 500) described above can be implemented by causing a computer, for example, to execute a program describing processing content that will be described in the embodiment.

In other words, the device can be implemented by executing a program corresponding to the process to be performed in the device using hardware resources such as a CPU or a memory built into a computer. The aforementioned program can be recorded, saved, and distributed in a computer-readable recording medium (portable memory or the like). In addition, the aforementioned program can also be provided through a network such as the Internet, an e-mail, or the like.

Figure 7:
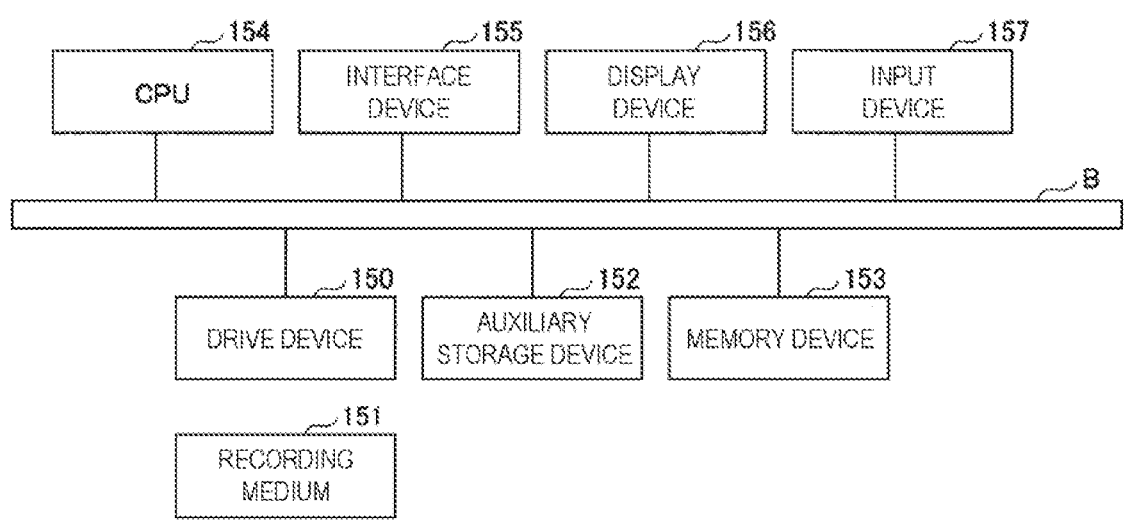
FIG. 7 is a diagram illustrating an example of a hardware configuration of a device.

FIG. 7 is a diagram illustrating an example of a hardware configuration of the computer in the embodiment. The computer in FIG. 7 includes, for example, a drive device 150, an auxiliary storage device 152, a memory device 153, a CPU 154, an interface device 155, a display device 156, and an input device 157 that are connected to each other via a bus B.

A program for performing a process in the computer, for example, is provided on a recording medium 151 such as a CD-ROM or a memory card. If the recording medium 151 storing the program is set in the drive device 150, then the program is installed in the auxiliary storage device 152 from the recording medium 151 via the drive device 150. However, the program is not necessarily installed from the recording medium 151 and may be downloaded from another computer via a network. The auxiliary storage device 152 stores the installed program and also stores required files, data, and the like.

The memory device 153 reads and stores the program from the auxiliary storage device 152 in a case in which a command for activating the program is issued. The CPU 154 achieves a function related to the device according to the program stored in the memory device 153. The interface device 155 is used as an interface for connection to the network. The display device 156 displays a graphical user interface (GUI) or the like based on the program. The input device 157 is configured of a keyboard and a mouse, a button, a touch panel, or the like, and is used to allow for inputs of various operation commands.

Hereinafter, Example 1 and a variation (including Example 2) will be described as examples of an operation of the communication system according to the embodiment with reference to a sequence diagram. The following examples show examples of an operation focused on the terminal 100A (a terminal of subscriber A) illustrated in FIG. 1 and FIG. 2, for example.

Example 1

Figure 8:
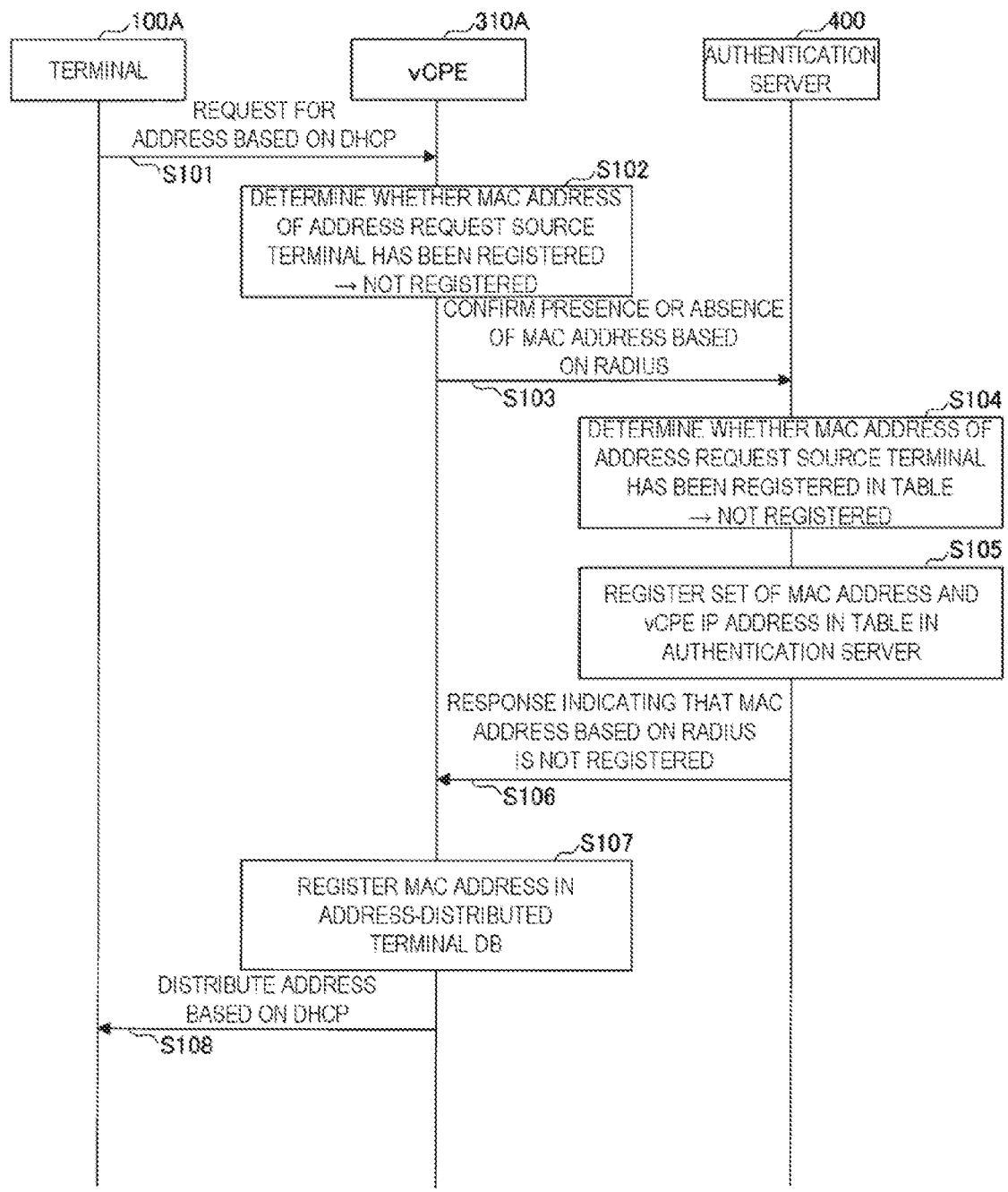
FIG. 8 is a diagram illustrating a sequence of operations in Example 1.

FIG. 8 illustrates an operation at the time of terminal connection in a case in which terminal information of terminal A is not present in either the vCPE 310A or the authentication server 400. This is an operation corresponding to a case in which the terminal 100A is initially connected with the in-home NW.

In S101, the terminal 100A transmits an address request based on the DHCP to the vCPE 310A. In S102, the vCPE 310A determines whether a MAC address of an address request source terminal (the terminal 100A) has been registered. There is no registration in the example of FIG. 8.

In S103, the vCPE 310A confirms whether a MAC address based on Radius has been registered in the authentication server 400. In S104, the authentication server 400 determines whether the MAC address of the address request source terminal (the terminal 100A) has been registered in a table. There is no registration in the example of FIG. 8.

Thus, in S105, the authentication server 400 registers a set of a MAC address of the terminal 100A and an IP addresses of the vCPE 310A in the terminal information table 410 in the authentication server 400. In S106, the authentication server 400 returns a response indicating that the MAC address based on Radius has not been registered, to the vCPE 310A.

In S107, the vCPE 310A registers the MAC address in the address-distributed terminal DB. The address-distributed terminal DB corresponds to the MAC table 313 (FIG. 6A) described above. In S108, the vCPE 310A performs address distribution based on the DHCP to the terminal 100A. In other words, the IP address is distributed.

Figure 9:
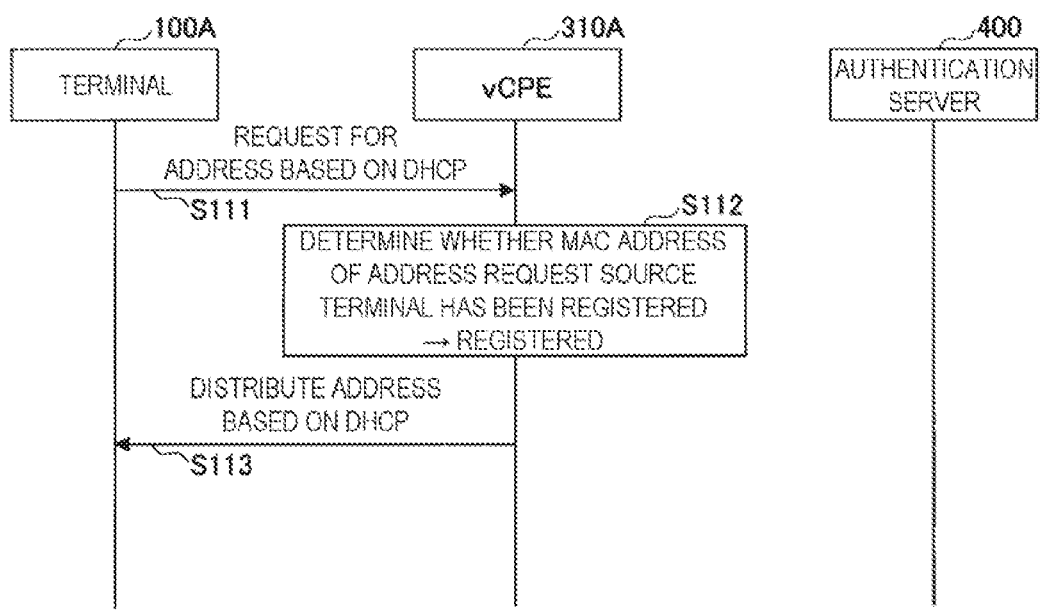
FIG. 9 is a diagram illustrating a sequence of operations in Example 1.

FIG. 9 illustrates an operation at the time of terminal connection when there is terminal information in the vCPE 310A. This is an operation corresponding to a case in which the terminal 100A is connected with the in-home NW a second time (and subsequent times).

In S111, the terminal 100A transmits an address request based on the DHCP to the vCPE 310A. In S112, the vCPE 310A determines whether a MAC address of an address request source terminal (the terminal 100A) has been registered. The registration is present in the example of FIG. 9. Thus, in S113, the vCPE 310A performs address distribution based on the DHCP to the terminal 100A.

Figure 10:
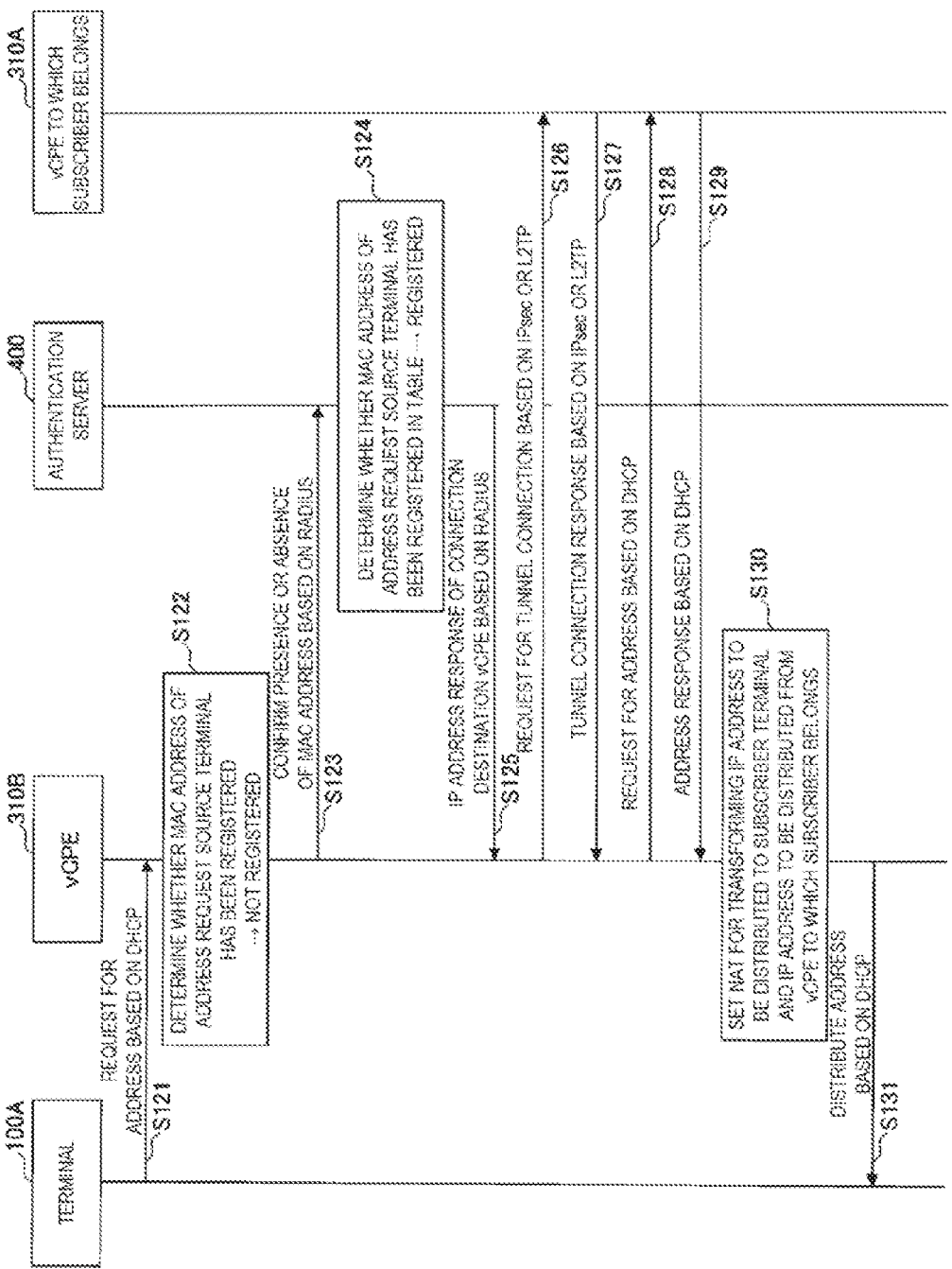
FIG. 10 is a diagram illustrating a sequence of operations in Example 1.

FIG. 10 illustrates an operation at the time of terminal connection in case in which there is no terminal information of the terminal 100A in the vCPE 310B and there is terminal information of the terminal 100A in the authentication server 400. This is an operation corresponding to a case in which the terminal 100A is connected to an outside-home NW.

In S121, the terminal 100A transmits the address request based on the DHCP to the vCPE 310B. In S122, the vCPE 310B determines whether the MAC address of the address request source terminal (the terminal 100A) has been registered. There is no registration in the example of FIG. 10.

In S123, the vCPE 310B confirms whether a MAC address based on Radius has been registered in the authentication server 400. In S124, the authentication server 400 determines whether the MAC address of the address request source terminal (the terminal 100A) has been registered in a table. The registration is present in the example of FIG. 10.

In S125, the authentication server 400 returns an IP address response of a connection destination vCPE based on Radius to the vCPE 310B. The response includes the IP address of the vCPE 310A that accommodates the terminal 100A.

In S126, the vCPE 310B transmits a tunnel connection request based on IPsec or L2TP to the vCPE 310A using the IP address of the vCPE 310A acquired in S125. In S127, the vCPE 310A returns a tunnel connection response based on IPsec or L2TP to the vCPE 310B. Thereby, vCPE 310B and vCPE 310A are connected by a tunnel.

In S128, the vCPE 310B transmits the address request based on the DHCP to the vCPE 310A. In S129, the vCPE 310A returns the address response based on the DHCP to the vCPE 310B. The response includes the IP address that the vCPE 310A distributes to the terminal 100A.

In S130, the vCPE 310B sets NAT that transforms an IP address that the vCPE 310B distributes to the terminal 100A and an IP address that is distributed from the vCPE 310A to which subscriber A belongs. This setting is, for example, to set the two addresses in the NAT table 314. Through this setting, for example, an IP address of a transmission source of a packet transmitted from the terminal 100A (the IP address that the vCPE 310B distributes to the terminal 100A) is transformed to the IP address distributed from the vCPE 310A to which subscriber A belongs.

In S131, vCPE 310B performs address distribution based on the DHCP to the terminal 100A. In other words, the IP address is distributed.

Variation

In the example described above, the MAC address is used as terminal authentication information in the authentication server 400, but this is merely an example. In addition to the authentication using the MAC address, authentication using a certificate or SIM information in an EAP-SIM authentication scheme may be performed.

Certificate

When the certificate is used, certificate authentication is used for authentication in the authentication server 400. Specifically, the authentication server 400 manages a set of certificate information of a terminal and an accommodation vCPE and performs authentication using the managed information. The certificate needs to be acquired in advance, but the certificate is acquired at the time of a subscriber's in-home NW connection, for example.

For confirmation of the MAC address for confirmation of whether the address is distributed in the vCPE 310 (for example: S102 in FIG. 8), a certificate may be used, a MAC address may be used as it is, or the confirmation may not be performed.

SIM Authentication

In the case of the SIM authentication, an EAP-SIM authentication scheme is used for authentication in the authentication server 400. Specifically, the authentication server 400 manages a set of SIM information of a terminal and an accommodation vCPE and performs authentication using the managed information.

For confirmation of the MAC address for confirmation of whether the address is distributed in the vCPE 310, SIM authentication may be used, a MAC address may be used as it is, or the confirmation may not be performed.

Registration of MAC Address in Authentication Server 400

Registration of the MAC address in the authentication server 400 may be performed only on the terminal 100 that is a movement target. An example of this operation will be described below as Example 2. This operation allows the number of pieces of information registered in the authentication server 400 to be reduced.

Approval of Connection in Outside-Home NW

A connection approval function may be included so that an owner of a connection destination NW can permit use of a network.

When the connection approval function is included, the owner of the connection destination NW selects permission or no permission of a connection via a web interface, for example. In the case of no permission, the vCPE 310 stops query of the authentication server 400. Alternatively, the query of the authentication server 400 is performed, but only the query is performed and a result of the query is discarded. In the case of permission, the same operation as a sequence of Example 1 (or Example 2) is performed.

Setting Regarding Function Use

A function for enabling a connection service user to select whether to use a function for a connection to the in-home NW outside the home may also be included.

When the function is included, the connection service user selects use or nonuse of a function via a web interface, for example. The same operation as the sequence of Example 1 (or Example 2) is performed at the time of the use of the function.

At the time of nonuse of the function, a setting is performed so that query of the authentication server 400 and registration of the MAC address are not performed, and terminal information on the terminal connected to the vCPE 310 is deleted from the authentication server 400. Alternatively, a setting is performed in the authentication server 400 so that a response to the vCPE 310 is not performed. As an example of such a setting, the cooperative performance presence/absence table illustrated in FIG. 4B is set. For example, a first line of the table illustrated in FIG. 4B shows that the outside-home connection of the terminal belonging to the vCPE with the IP address 1 indicates presence, and the vCPE with the IP address 1 does not allow a connection from another vCPE.

Example 2

Next, Example 2 will be described. As described above, Example 2 is an example in which registration of terminal information in the authentication server 400 is performed only for a terminal that is a movement target.

Figure 11:
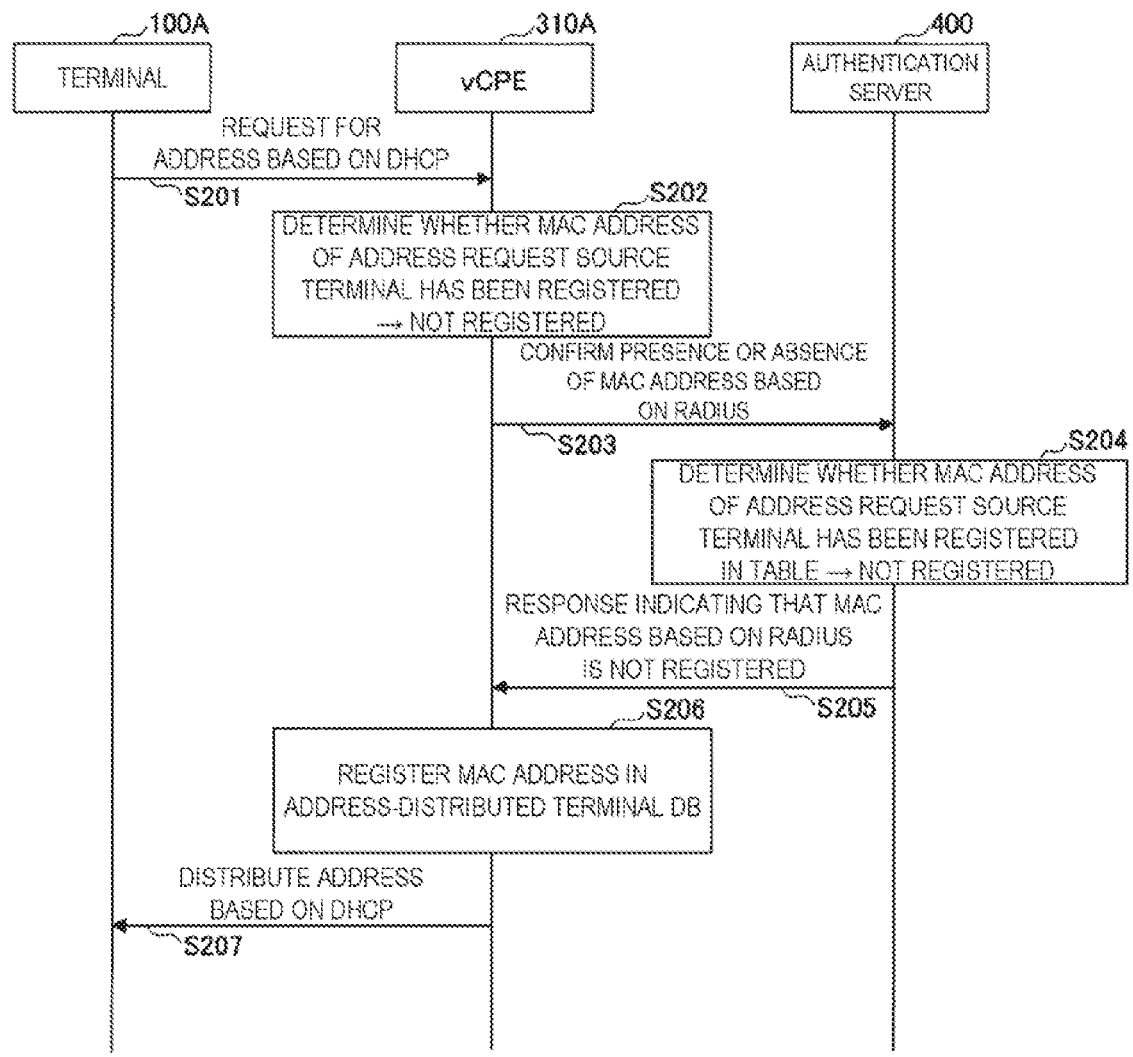
FIG. 11 is a diagram illustrating a sequence of operations in Example 2.

FIG. 11 illustrates an operation at the time of terminal connection in a case in which there is no terminal information of the terminal 100A in the vCPE 310A and the authentication server 400. This is an operation corresponding to a case in which the terminal 100A is initially connected with the in-home NW.

In S201, the terminal 100A transmits an address request based on the DHCP to the vCPE 310A. In S202, the vCPE 310A determines whether a MAC address of an address request source terminal (the terminal 100A) has been registered. There is no registration in the example of FIG. 11.

In S203, the vCPE 310A confirms whether a MAC address based on Radius has been registered in the authentication server 400. In S204, the authentication server 400 determines whether the MAC address of the address request source terminal (the terminal 100A) has been registered in a table. There is no registration in the example of FIG. 11.

In S205, the authentication server 400 returns a response indicating that the MAC address based on Radius has not been registered, to the vCPE 310A. In S206, the vCPE 310A registers the MAC address in the address-distributed terminal DB. In S207, the vCPE 310A performs address distribution based on the DHCP to the terminal 100A.

Figure 12:
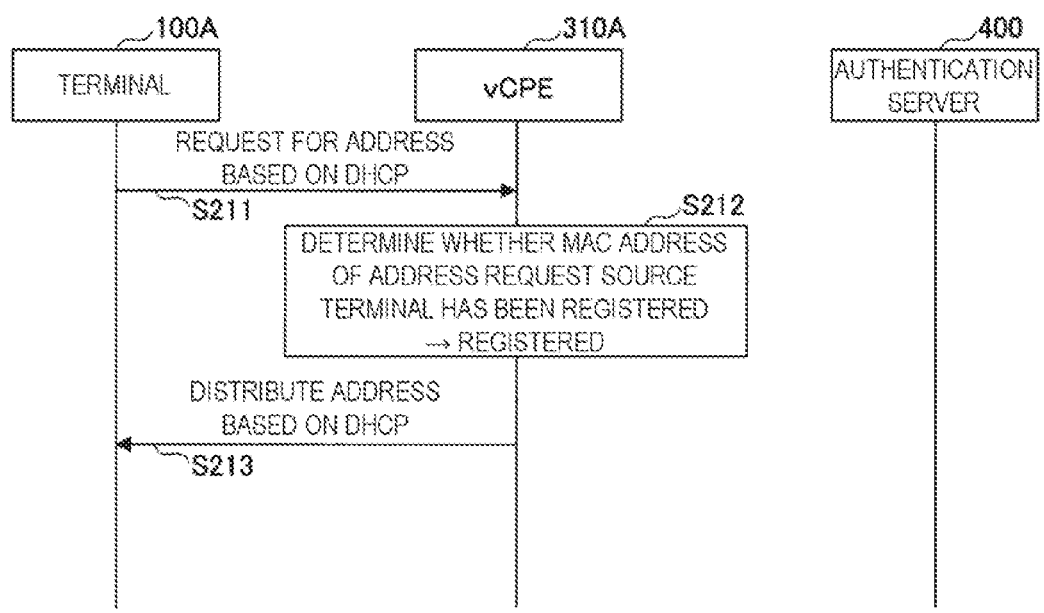
FIG. 12 is a diagram illustrating a sequence of operations in Example 2.

FIG. 12 illustrates an operation at the time of terminal connection when there is terminal information in the vCPE 310A. This is an operation corresponding to a case in which the terminal 100A is connected with the in-home NW a second time (and subsequent times).

In S211, the terminal 100A transmits the address request based on the DHCP to the vCPE 310A. In S212, the vCPE 310A determines whether a MAC address of an address request source terminal (the terminal 100A) has been registered. The registration is present in the example of FIG. 12. In S213, the vCPE 310A performs address distribution based on the DHCP to the terminal 100A.

Figure 13:
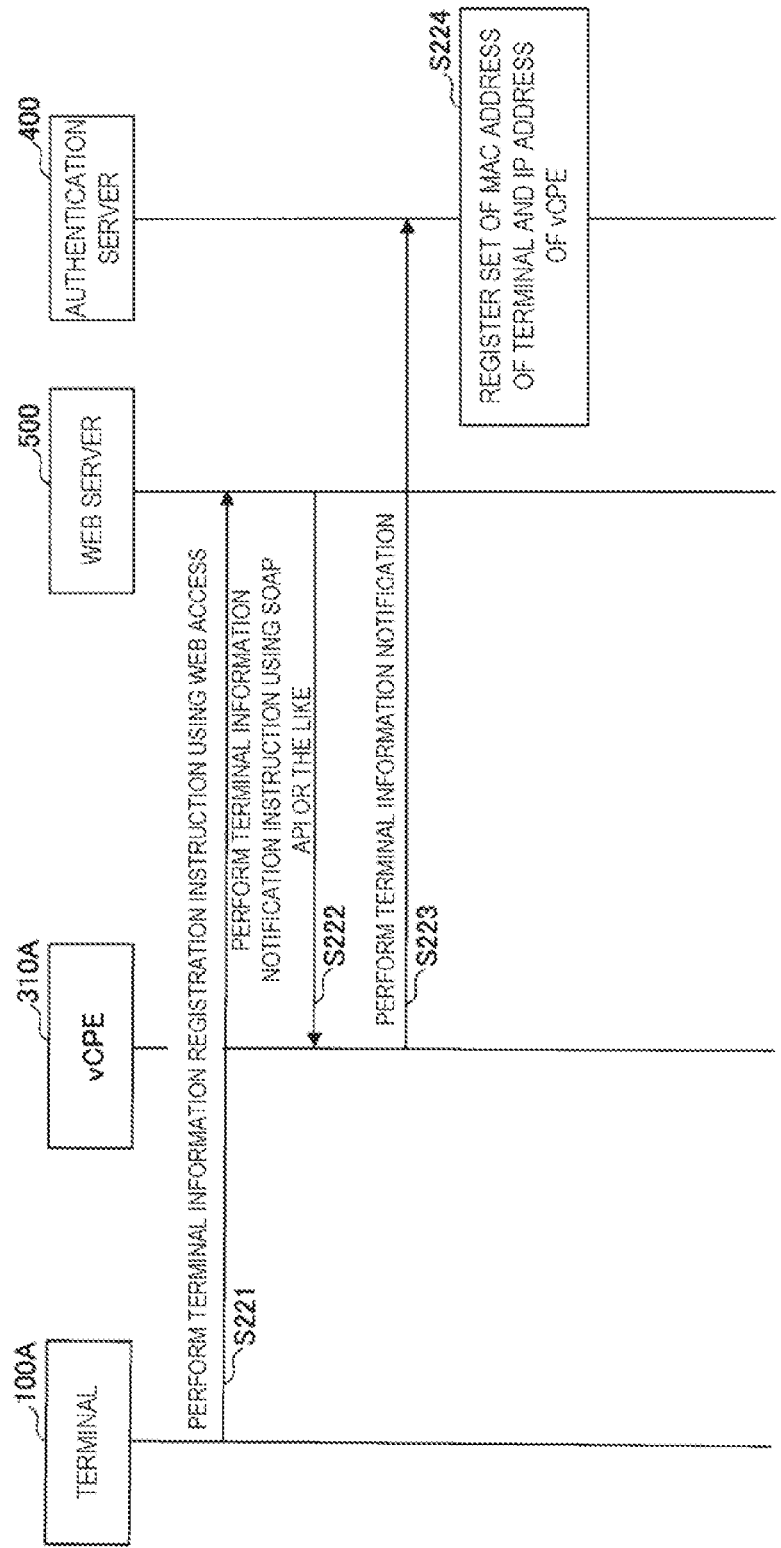
FIG. 13 is a diagram illustrating a sequence of operations in Example 2.

FIG. 13 illustrates an example of an operation when terminal information is registered in the authentication server 400. In S221, the terminal 100A transmits a terminal information registration instruction to the web server 500 through web access. In S222, the web server 500 transmits a terminal information notification instruction to the vCPE 310A through an SOAP API or the like.

In S223, the vCPE 310A transmits the terminal information notification to the authentication server 400. In S224, the authentication server 400 registers a set of a MAC address of the terminal 100A and an IP addresses of the vCPE 310A in the terminal information table 410.

Figure 14:
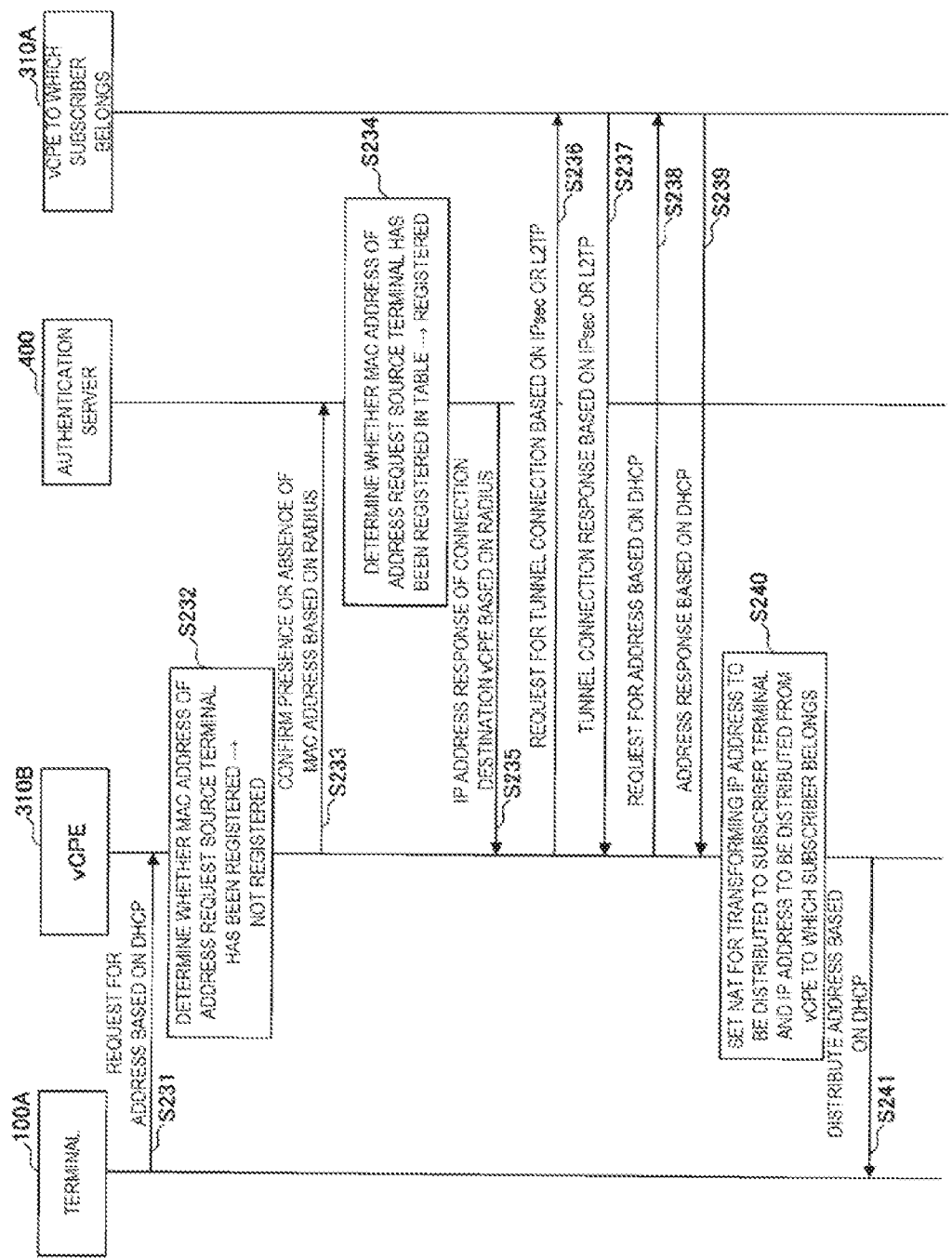
FIG. 14 is a diagram illustrating a sequence of operations in Example 2.

FIG. 14 illustrates an operation at the time of terminal connection in a case in which there is no terminal information of the terminal 100A in the vCPE 310B and there is the terminal information of the terminal 100A in the authentication server 400. This is an operation corresponding to a case in which the terminal 100A is connected to an outside-home NW.

In S231, the terminal 100A transmits the address request based on the DHCP to the vCPE 310B. In S232, the vCPE 310B determines whether the MAC address of the address request source terminal (the terminal 100A) has been registered. There is no registration in the example of FIG. 14.

In S233, the vCPE 310B confirms whether a MAC address based on Radius has been registered in the authentication server 400. In S234, the authentication server 400 determines whether the MAC address of the address request source terminal (the terminal 100A) has been registered in a table. There is the registration in the example of FIG. 14.

In S235, the authentication server 400 returns an IP address response of a connection destination vCPE based on Radius to the vCPE 310B. The response includes an IP address of the vCPE 310A that accommodates the terminal 100A.

In S236, the vCPE 310B transmits a tunnel connection request based on IPsec or L2TP to the vCPE 310A using the IP address of the vCPE 310A acquired in S235. In S237, the vCPE 310A returns a tunnel connection response based on IPsec or L2TP to the vCPE 310B. Thereby, the vCPE 310B and the vCPE 310A are connected to each other by a tunnel.

In S238, the vCPE 310B transmits the address request based on the DHCP to the vCPE 310A. In S239, the vCPE 310A returns the address response based on the DHCP to the vCPE 310B.

In S240, the vCPE 310B sets NAT that transforms an IP address that the vCPE 310B distributes to the terminal 100A and an IP address that is distributed from the vCPE 310A to which subscriber A belongs. In S241, the vCPE 310B performs address distribution based on the DHCP to the terminal 100A.

Effects and Conclusion of Embodiment

According to the embodiment, the authentication server 400 manages the terminal information and enables cooperation between the vCPEs, thereby enabling a subscriber to use the same line services or ISP services as inside a home even outside a home.

Summary of Embodiment

As described above, according to the embodiment, there is provided a communication system comprising a first virtual CPE to which a terminal belongs, a second virtual CPE, and an authentication server, wherein, when the terminal connects to the second virtual CPE, the second virtual CPE performs a tunnel connection with the first virtual CPE by performing the following process.

The second virtual CPE confirms whether terminal information of the terminal is registered in the authentication server, and when the terminal information is registered in the authentication server, the authentication server notifies the second virtual CPE of an address of the first virtual CPE.

The second virtual CPE receives an IP address distributed from the first virtual CPE, and performs a setting for executing a transformation between an IP address distributed to the terminal by the second virtual CPE and the IP address distributed from the first virtual CPE.

The authentication server registers a set of terminal information and an address of a virtual CPE accommodating a terminal having the terminal information. Further, when the terminal first connects to the first virtual CPE, the authentication server registers terminal information of the terminal. Further, the registration of the terminal information in the authentication server is performed only for a terminal being a movement target.

Although the embodiment has been described above, the present invention is not limited to such a specific embodiment, and various modifications and changes can be made within the scope of the gist of the present invention described in the claims.

REFERENCE SIGNS LIST

100 Terminal
110 CPE
200 Router
300 vCPE server
310 vCPE
311 NAT functional unit
312 DHCP functional unit
313 MAC table
314 NAT table
315 Tunnel termination functional unit
400 Authentication server
410 Terminal information table
420 Cooperative performance presence table
500 Web server
150 Drive device
151 Recording medium
152 Auxiliary storage device
153 Memory device
154 CPU
155 Interface device
156 Display device
157 Input device

The invention claimed is:

1. A communication system comprising a first virtual customer premise equipment (CPE) to which a terminal belongs, a second virtual CPE, and an authentication server,
   wherein, when the terminal first connects to the first virtual CPE, the authentication server registers i) terminal information of the terminal comprising a MAC address of the terminal and ii) an address of the first virtual CPE comprising an IP address of the first virtual CPE in a table,
   when the terminal connects to the second virtual CPE, the second virtual CPE confirms whether the terminal information of the terminal comprising the MAC address of the terminal is registered in the authentication server, and
   when the terminal information is registered in the authentication server, the authentication server notifies the second virtual CPE of the address of the first virtual CPE comprising the IP address of the first virtual CPE, and the second virtual CPE performs a tunnel connection to the first virtual CPE based on the IP address of the first virtual CPE.

2. The communication system according to claim 1, wherein the second virtual CPE receives an IP address distributed from the first virtual CPE, and performs a setting for executing a transformation between an IP address distributed to the terminal by the second virtual CPE and the IP address distributed from the first virtual CPE.

3. The communication system according to claim 1, wherein the authentication server registers a set of terminal information and an address of a virtual CPE accommodating a terminal having the terminal information.

4. The communication system according to claim 1, wherein the registration of the terminal information in the authentication server is performed only for a terminal being a movement target.

5. A communication method executed in a communication system comprising a first virtual CPE to which a terminal belongs, a second virtual CPE, and an authentication server,
- wherein, when the terminal first connects to the first virtual CPE, the authentication server registers i) terminal information of the terminal comprising a MAC address of the terminal and ii) an address of the first virtual CPE comprising an IP address of the first virtual CPE in a table,
- when the terminal connects to the second virtual CPE, the second virtual CPE confirms whether the terminal information of the terminal comprising the MAC address of the terminal is registered in the authentication server, and
- when the terminal information is registered in the authentication server, the authentication server notifies the second virtual CPE of the address of the first virtual CPE comprising the IP address of the first virtual CPE, and the second virtual CPE performs a tunnel connection to the first virtual CPE based on the IP address of the first virtual CPE.

6. The communication method according to claim 5, wherein the second virtual CPE receives an IP address distributed from the first virtual CPE, and performs a setting for executing a transformation between an IP address distributed to the terminal by the second virtual CPE and the IP address distributed from the first virtual CPE.

7. The communication method according to claim 5, wherein the authentication server registers a set of terminal information and an address of a virtual CPE accommodating a terminal having the terminal information.

8. The communication method according to claim 5, wherein the registration of the terminal information in the authentication server is performed only for a terminal being a movement target.

\* \* \* \* \*